US007280095B2

(12) United States Patent
Grant

(10) Patent No.: US 7,280,095 B2
(45) Date of Patent: Oct. 9, 2007

(54) HIERARCHICAL METHODS FOR GENERATING FORCE FEEDBACK EFFECTS

(75) Inventor: Danny Grant, Montreal (CA)

(73) Assignee: Immersion Corporation, San Jose, CA (US)

( * ) Notice: Subject to any disclaimer, the term of this patent is extended or adjusted under 35 U.S.C. 154(b) by 101 days.

(21) Appl. No.: 10/425,718

(22) Filed: Apr. 30, 2003

(65) Prior Publication Data
US 2004/0217942 A1 Nov. 4, 2004

(51) Int. Cl.
*G09G 5/00* (2006.01)
(52) U.S. Cl. ............... 345/156; 345/161; 345/163; 345/167; 341/34
(58) Field of Classification Search ........ 345/156–169; 341/22, 34; 463/37–38; 273/148 B
See application file for complete search history.

(56) References Cited

U.S. PATENT DOCUMENTS

| 3,157,853 | A | 11/1964 | Hirsch |
| 3,220,121 | A | 11/1965 | Cutler |
| 3,497,668 | A | 2/1970 | Hirsch |
| 3,517,446 | A | 6/1970 | Corlyon et al. |
| 3,623,064 | A | 11/1971 | Kagan |
| 3,902,687 | A | 9/1975 | Hightower |
| 3,903,614 | A | 9/1975 | Diamond et al. |
| 3,911,416 | A | 10/1975 | Feder |
| 4,160,508 | A | 7/1979 | Salisbury, Jr. |
| 4,236,325 | A | 12/1980 | Hall et al. |
| 4,477,043 | A | 10/1984 | Repperger |
| 4,513,235 | A | 4/1985 | Acklam et al. |
| 4,581,491 | A | 4/1986 | Boothroyd |

(Continued)

FOREIGN PATENT DOCUMENTS

EP 0 349 086 A1 1/1990

(Continued)

OTHER PUBLICATIONS

Baigrie, "Electric Control Loading—A Low Cost, High Performance Alternative," *Proceedings of Interservice/Industry Training Systems Conference*, pp. 247-254, Nov. 6-8, 1990.

(Continued)

*Primary Examiner*—Lun-Yi Lao
(74) *Attorney, Agent, or Firm*—Thelen Reid Brown Raysman & Steiner LLP

(57) ABSTRACT

Embodiments of the invention relate to a hierarchical method for generating force feedback effects. In one embodiment, a method comprises receiving a first force contribution associated with a first (e.g., previous) position of a manipulandum; determining a second force contribution associated with a second (e.g., current) position of the manipulandum; and outputting a force signal to an actuator coupled to the manipulandum, such that the actuator renders a feedback force having a sum of the first and second force contributions. The method may further include classifying force effects according to a predetermined "hierarchy" (or "priority") scheme, whereby the second force contribution is related to "high" priority force effects associated with the second position, and the first force contribution is related to "low" priority force effects associated with the first position. As such, computation delay in outputting force feedback effects can be substantially reduced, thereby enhancing the stability and performance of the underlying force feedback system.

17 Claims, 3 Drawing Sheets

U.S. PATENT DOCUMENTS

| | | |
|---|---|---|
| 4,599,070 A | 7/1986 | Hladky et al. |
| 4,708,656 A | 11/1987 | de Vries et al. |
| 4,713,007 A | 12/1987 | Alban |
| 4,794,392 A | 12/1988 | Selinko |
| 4,891,764 A | 1/1990 | McIntosh |
| 4,930,770 A | 6/1990 | Baker |
| 4,934,694 A | 6/1990 | McIntosh |
| 4,935,728 A | 6/1990 | Kley |
| 4,961,038 A | 10/1990 | MacMinn |
| 5,019,761 A | 5/1991 | Kraft |
| 5,022,407 A | 6/1991 | Horch et al. |
| 5,035,242 A | 7/1991 | Franklin et al. |
| 5,038,089 A | 8/1991 | Szakaly |
| 5,078,152 A | 1/1992 | Bond et al. |
| 5,103,404 A | 4/1992 | McIntosh |
| 5,212,473 A | 5/1993 | Louis |
| 5,240,417 A | 8/1993 | Smithson et al. |
| 5,264,768 A * | 11/1993 | Gregory et al. ............ 318/561 |
| 5,264,836 A | 11/1993 | Rubin |
| 5,271,290 A | 12/1993 | Fischer |
| 5,275,174 A | 1/1994 | Cook |
| 5,298,890 A | 3/1994 | Kanamaru et al. |
| 5,299,810 A | 4/1994 | Pierce et al. |
| 5,309,140 A | 5/1994 | Everett, Jr. et al. |
| 5,334,027 A | 8/1994 | Wherlock |
| 5,374,942 A | 12/1994 | Gilligan et al. |
| 5,466,213 A | 11/1995 | Hogan et al. |
| 5,471,571 A | 11/1995 | Smith et al. |
| 5,513,100 A * | 4/1996 | Parker et al. ................ 700/56 |
| 5,524,195 A | 6/1996 | Clanton, III et al. |
| 5,526,480 A | 6/1996 | Gibson |
| 5,547,382 A | 8/1996 | Yamasaki et al. |
| 5,550,562 A | 8/1996 | Aoki et al. |
| 5,551,701 A | 9/1996 | Bouton et al. |
| 5,565,887 A | 10/1996 | McCambridge et al. |
| 5,565,888 A | 10/1996 | Selker |
| 5,570,111 A | 10/1996 | Barrett et al. |
| 5,586,257 A | 12/1996 | Perlman |
| 5,596,347 A | 1/1997 | Robertson et al. |
| 5,628,686 A | 5/1997 | Svancarek et al. |
| 5,696,532 A | 12/1997 | Caprara |
| 5,696,535 A | 12/1997 | Rutledge et al. |
| 5,710,574 A | 1/1998 | Jaaskelainen, Jr. |
| 5,745,715 A | 4/1998 | Pickover et al. |
| 5,757,358 A | 5/1998 | Osga |
| 5,766,016 A | 6/1998 | Sinclair et al. |
| 5,785,630 A | 7/1998 | Bobick et al. |
| 5,791,992 A | 8/1998 | Crump et al. |
| 5,802,353 A | 9/1998 | Avila et al. |
| 5,805,165 A | 9/1998 | Thorne, III et al. |
| 5,805,601 A | 9/1998 | Takeda et al. |
| 5,808,601 A | 9/1998 | Leah et al. |
| 5,816,823 A | 10/1998 | Naimark et al. |
| 5,818,423 A | 10/1998 | Pugliese et al. |
| 5,841,710 A | 11/1998 | Larsen |
| 5,844,392 A | 12/1998 | Peurach et al. |
| 5,877,748 A | 3/1999 | Redlich |
| 5,877,750 A | 3/1999 | Hanson |
| 5,884,029 A | 3/1999 | Brush, II et al. |
| 5,896,125 A | 4/1999 | Niedzwiecki |
| 5,896,139 A | 4/1999 | Strauss |
| 5,897,437 A | 4/1999 | Nishiumi et al. |
| 5,914,716 A | 6/1999 | Rubin et al. |
| 5,956,040 A | 9/1999 | Asano et al. |
| 5,959,613 A * | 9/1999 | Rosenberg et al. ......... 345/161 |
| 5,973,670 A | 10/1999 | Barber et al. |
| 5,973,689 A | 10/1999 | Gallery |
| 5,977,977 A | 11/1999 | Kajiya et al. |
| 5,990,860 A | 11/1999 | Takeuchi |
| 5,990,875 A | 11/1999 | Bi et al. |
| 5,999,168 A * | 12/1999 | Rosenberg et al. ......... 345/161 |
| 5,999,185 A | 12/1999 | Kato et al. |
| 6,008,800 A | 12/1999 | Pryor |
| 6,084,587 A | 7/2000 | Tarr et al. |
| 6,111,562 A | 8/2000 | Downs et al. |
| 6,147,674 A * | 11/2000 | Rosenberg et al. ......... 345/157 |
| 6,157,367 A | 12/2000 | Van Der Haar et al. |
| 6,160,907 A | 12/2000 | Robotham et al. |
| 6,181,318 B1 | 1/2001 | Lim |
| 6,215,495 B1 | 4/2001 | Grantham et al. |
| 6,266,053 B1 | 7/2001 | French et al. |
| 6,282,455 B1 | 8/2001 | Engdahl |
| 6,285,351 B1 * | 9/2001 | Chang et al. ............... 345/156 |
| 6,300,936 B1 * | 10/2001 | Braun et al. ................ 345/156 |
| 6,326,964 B1 | 12/2001 | Snyder et al. |
| 6,373,463 B1 | 4/2002 | Beeks |
| 6,433,771 B1 | 8/2002 | Yocum et al. |
| 6,710,764 B1 * | 3/2004 | Burgel et al. ............... 345/156 |
| 2002/0109668 A1 * | 8/2002 | Rosenberg et al. ......... 345/156 |

FOREIGN PATENT DOCUMENTS

| | | |
|---|---|---|
| JP | H2-185278 | 7/1990 |
| JP | H4-8381 | 1/1992 |
| JP | H5-192449 | 8/1993 |
| JP | H7-24147 | 1/1995 |

OTHER PUBLICATIONS

Iwata, "Pen-based Haptic Virtual Environment," 0-7803-1363-1/93 IEEE, pp. 287-292, 1993.

Russo, "The Design and Implementation of a Three Degree of Freedom Force Output Joystick," *MIT Libraries Archives* pp. 1-131, May 1990, archived Aug. 14, 1990.

Brooks et al., "Hand Controllers for Teleoperation—A State-of-the-Art Technology Survey and Evaluation," *JPL Publication* 85-11, NASA-CR-175890; N85-28559, pp. 1-84, Mar. 1, 1985.

Jones et al., "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., Model-X Force-Reflecting-Hand-Controller, NT Control No. NPO-17851; JPL Case No. 7348, pp. 1-4 with 45 pages of attachments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Environment Simulator Using Motor/Brake Pair Actuators," *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein et al., "Design and Implementation of a Force Reflecting Manipulandum for Manual Control research," DSC-vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Coop-*

*erative Intelligent Robotics in Space*, Rui J. deFigueiredo et al, Editor, Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-Machine Interface for Advanced Teleoperation,"0 *Science*, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

McAffee et al., "Teleoperator Subsystem/Telerobot Demostrator: Force Reflecting Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop, JSC*, Houston, TX, Jul. 25-27, 1989.

Ouhyoung et al., "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Scannell, "Taking a Joystick Ride," Computer Currents, Boston Edition, vol. 9, No. 11, Nov. 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

Aliaga, D., "Virtual Objects in the Real World", Communications of ACM (CACM), vol. 40, No. 3, pp. 49-54, 1997.

Bro-Nielsen, M., 'Finite Element Modeling in Surgery Simulation', Journal of the IEEE 86(3), 491-503, (1998).

Burdea, G., et al., "A portable dextrous master with force feedback," Presence: Teleoperators and Virtual Environments, 1(1):18-28, (1992).

Dachille IX, F., et al., "Haptic Sculpting of Dynamic Surfaces," In the Proceedings of Symposium on Interactive 3D Graphics 1999, pp. 103-110, (1999).

Hac, A., et al., "Synchronization in multimedia data retrieval," vol. 7 International Journal of Network Management, 33-62, (1997).

Hardman, L., et al., "Do You Have the Time? Composition and Linking in Time-based Hypermedia," Proceedings of the 10th ACM Conference on Hypertext and Hypermedia, Darmstadt, Germany, pp. 189-196, (Feb. 21-25, 1999).

Hesina, G., et al, "Distributed Open Inventor: A Practical Approach to Distributed 3D Graphics," In Symposium on Virtual Reality Software and Technology, pp. 74-81, London, UK, (Dec. 20-22, 1999).

Hildreth, B., et al, "DC Servo-Motors for High Performance High Reliability Control Loading in Flight Simulators," American Defense Preparedness Association 12th Interservice/Industry Training System Conference, pp. 255-262, Nov. 6-8, 1990.

Hudson, T., et al, "VCOLLIDE: Accelerated Collision Detection for VRML,"in: Proceedings of the 2nd Annual Symposium on the Virtual Reality Modeling Language (VRML 97), Monterey, CA, USA, pp. 117-124, (1997).

Lemkin, M., et al., "Velocity Estimation From Widely Spaced Encoder Pulses,"in: Proceedings of the American Control Conference, Seattle, WA, pp. 998-1002, (Jun. 1995).

MacLean, K., "The Haptic Camera: A Technique for Characterizing and Playing Back Haptic Environments," in: Proceedings of the 5th Annual Symposium on Haptic Interfaces for Virtual Environments and Teleoperator Systems, ASME/IMECE, Atlanta, GA, DSC-vol. 58, reprint, (1996).

Ouh-Young, M., et al., "Creating an Illusion of Feel: Control Issues in Force Display," Computer Science Department, University of North Carolina at Chapel Hill, Chapel Hill, NC, pp. 1-14, Sep. 16, 1989, (1989).

Rinaldi, P., "Digital Control Loading--A Modular Approach," International Air Transport Association, 6th Meeting of the Flight Simulator Technical Sub-Committee, Montreal, Jun. 1-4, 1982, (1982).

Stanley, M., et al., "Computer Simulation of Interacting Dynamic Mechanical Systems Using Distributed Memory Parallel Processors," DSC-vol. 42, Advances in Robotics, ASME 1992, pp. 55-61, (1992).

\* cited by examiner

HIERARCHICAL METHODS FOR GENERATING FORCE FEEDBACK EFFECTS

FIELD OF THE INVENTION

This invention relates generally to haptic feedback systems. More specifically, embodiments of the invention relate to a hierarchical method for computing force feedback effects.

BACKGROUND

Haptic feedback provides for a new modality of sensing and enhances human experiences in many applications. Kinesthetic force feedback is desired, for instance, in situations where force feedback effects are provided in an interactive (or dynamic) manner, such as flying/driving applications, medical simulations, gaming, virtual reality environments, and consumer electronics.

FIG. 1 shows a flowchart of a conventional method for generated kinesthetic force feedback effects. Flowchart 100 includes determining a position of a manipulandum (e.g., a joystick), as recited in step 110; computing force feedback effects associated with the position, as recited in step 120; and outputting a force signal to an actuator coupled to the manipulandum that renders the computed force feedback effects, as recited in step 130.

In the above, the amount of time it takes for computing the force feedback effects in the step 120 constitutes a delay in outputting the force feedback effects associated with the current position of the manipulandum. This computational delay can significantly compromise the stability, robustness and temporal accuracy of the underlying force feedback system.

A need thus exists for minimizing the computational delay and enhancing the stability and performance of kinesthetic force feedback systems.

BRIEF SUMMARY OF THE INVENTION

Embodiments of the invention relate to a hierarchical method for generating kinesthetic force feedback effects.

In one embodiment, a first force contribution associated with a first position of a manipulandum is received. A second force contribution associated with a second position of the manipulandum is determined. A force signal is output to an actuator coupled to the manipulandum, such that the actuator renders a feedback force that includes a sum of the first and second force contributions.

A BRIEF DESCRIPTION OF THE DRAWINGS

DETAILED DESCRIPTION

Embodiments of the invention relate to a hierarchical method for generating kinesthetic force feedback effects.

In one embodiment, force effects are classified according to a predetermined hierarchy (or priority) scheme. For example, such a priority scheme can associate force effects with priority values such as, for example, "high" priority force effects and "low" priority force effects. The terms "high" and "low" used to connote the priority of force effects are used for embodiments having two possible priority values; alternative embodiments can have a different number of possible priority values. The association of force effects with priority values can be, for example, stored in a look-up table. The priority determination may be based on system stability, for instance, such that the high priority force effects have a greater impact on the system stability than the low priority force effects.

At a current position of a manipulandum (e.g., a knob), a first force contribution including the low priority force effects associated with a previous position of the manipulandum is received; and a second force contribution including the high priority force effects associated with the current position is determined. In this example, the previous position of the manipulandum can be referred to as a first position, and the current position of the manipulandum can be referred to as a second position.

A force signal is then output to an actuator coupled to the manipulandum, such that the actuator renders a feedback force that includes a sum of the first and second force contributions. As such, the computation delay in outputting the force feedback effects can be substantially reduced, thereby enhancing the stability, performance and temporal accuracy of the underlying force feedback system.

The second force contribution including the high priority force effects associated with the current position can be determined in a number of ways. For example, the second force contribution can be determined by a concurrent calculation or a look-up table of predetermined calculations.

The ensuing description provides further examples of the invention.

Figure 1:
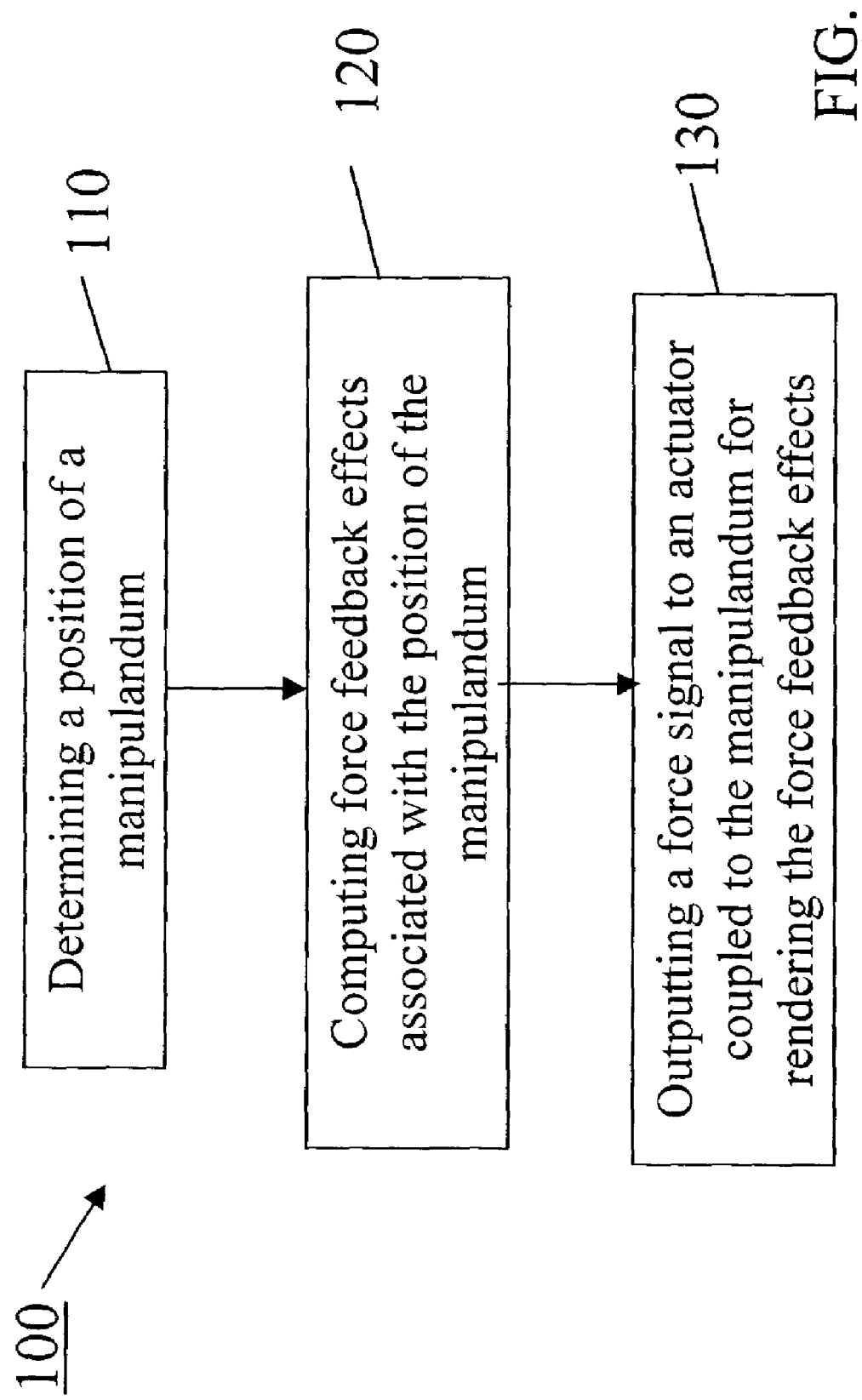
FIG. 1 shows a flowchart of a conventional method for generating kinesthetic force feedback effects.
Figure 2:
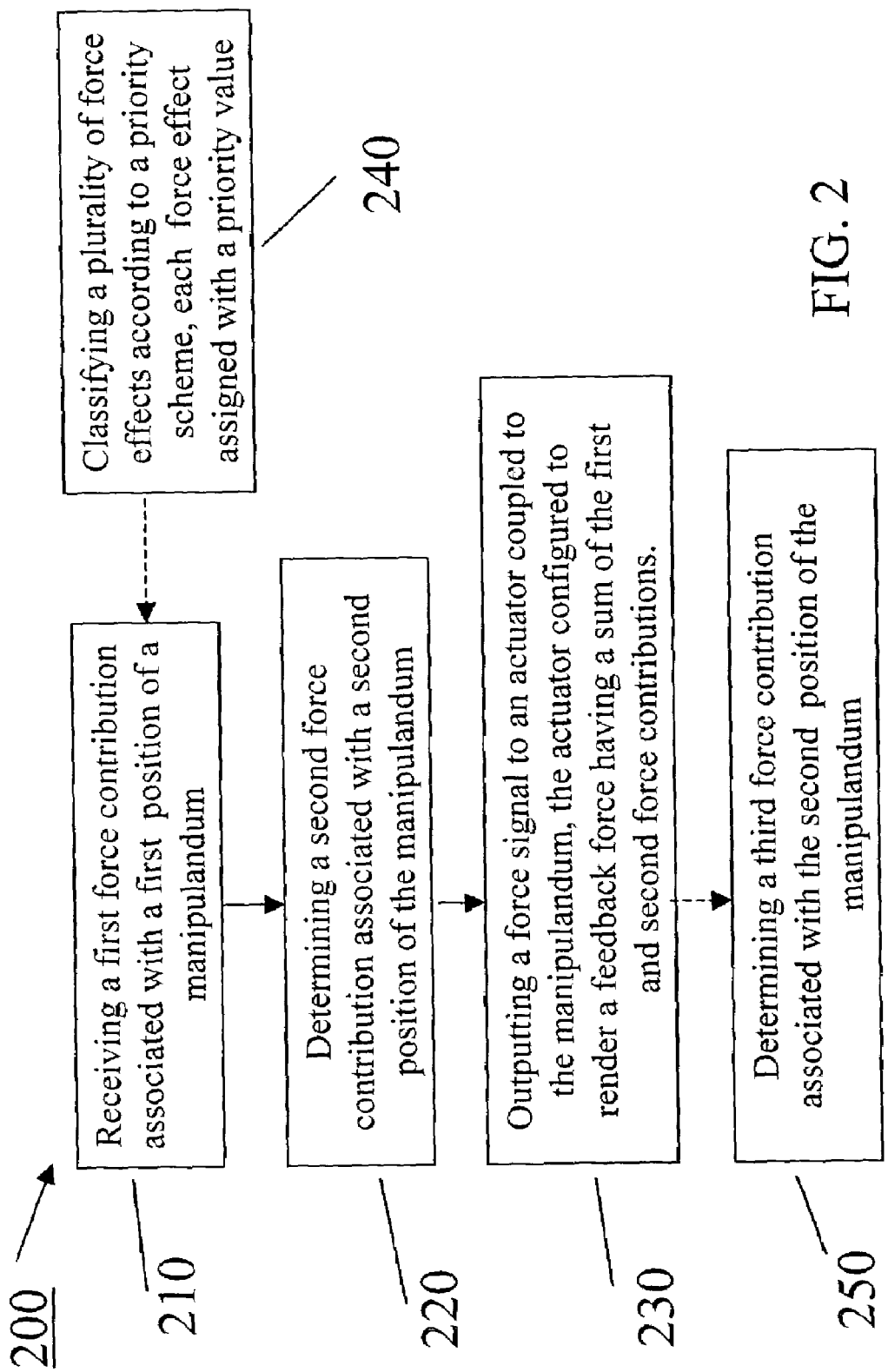
FIG. 2 depicts a flowchart of a hierarchical method for generating kinesthetic force feedback effects, according to an embodiment of the invention.

FIG. 2 depicts a flowchart 200 of a hierarchical method for generating kinesthetic force feedback effects, according to an embodiment of the invention. As shown by the example of the flowchart 200, a first force contribution associated with a first position of a manipulandum is received, as recited in step 210. A second force contribution associated with a second position of the manipulandum is determined, where the second position is subsequent to the first position, as recited in step 220 A force signal is output to an actuator coupled to the manipulandum. The actuator is configured to render a feedback force having a sum of the first and second force contributions, as recited in step 230.

In the above description, the first and second positions of the manipulandum may refer to a previous position and a current position of the manipulandum, respectively. Alternatively, the first and second positions of the manipulandum can refer to different positions of the manipulandum at different times, for example where the manipulandum is in the second position after the first position. The flowchart 200 may further include classifying force effects according to a predetermined hierarchy (or priority) scheme, as recited in step 240, such that each force effect is assigned with a priority value. In one embodiment, the first force contribution may include one or more force effects that are characterized by a first (e.g., "low") priority value; and the second force contribution may include one or more force effects that are characterized by a second (e.g., "high") priority value. The "priority" determination may be based on system stability and performance, for example, as further described below. The flowchart 200 may additionally include determining a third force contribution associated with the second position of the manipulandum after outputting the force signal, as recited in step 250. The third force contribution may be related to one or more "low" priority force effects associated with the second position.

As described above, the priority determination may be based on the system stability, such that the "high" priority force effects have a greater impact on the system stability than the "low" priority force effects. In one scenario, the high priority force effects for example may be associated with "condition effects" that are characteristic of some of the underlying physical properties of a force feedback system, such as the stiffness, inertia, damping, and friction characteristics of the manipulandum (e.g., a knob), and can therefore be a function of the manipulandum's motion. The "low" priority force effects for example may be correlated with "temporal events" and can thus be characterized by predetermined temporal profiles. Such "temporal effects" are typically predefined functions of time (e.g., vibrations and/or jolts) that are "overlaid" on top of the background "condition effects" described above, thus imposing less impact on the system stability. U.S. Pat. No. 6,147,674 describes in greater detail various "condition" and "temporal" effects, and describes methods for designing suitable force sensations thereof, which is incorporated herein by reference.

Referring back to the flowchart 200 of FIG. 2, the high priority force effects associated with a current (or "second") position of the manipulandum, along with the low priority force effect associated with a previous (or "first") position of the manipulandum, are output at, or substantially near the current position of the manipulandum. (The latter scenario may be due to a small delay between calculating and outputting the forces effects.) The low priority force effects associated with the current position of the manipulandum may then be computed, and likewise output at a next position of the manipulandum. In this way, the computation delay can be substantially reduced, without markedly compromising the force sensations to be delivered.

In another scenario, the high priority force effects may be associated with the force effects that are characterized by a high gain (termed "high gain force effects" herein), and the low priority force effects associated with the force effects that are characterized by a low gain (termed herein "low gain force effects"), where the "high gain force effects" impose a more critical impact on the system stability than the "low gain force effects."

In other embodiments, the first force contribution may include force effects that are associated with, for example, a first range of priority values. The second force contribution may likewise include force effects associated with a second range of priority values. The priority values may be assigned based on other factors or metrics of interest. Moreover, the priority (or hierarchy) scheme for classifying force effects may be modified on a dynamic basis. It will be appreciated that by prioritizing the generation of force effects such as described above, the computation delay in outputting the force feedback effects can be substantially reduced. This can enhance the stability and robustness of a force feedback system, and can afford more realistic feedback sensations to a user.

Figure 3:
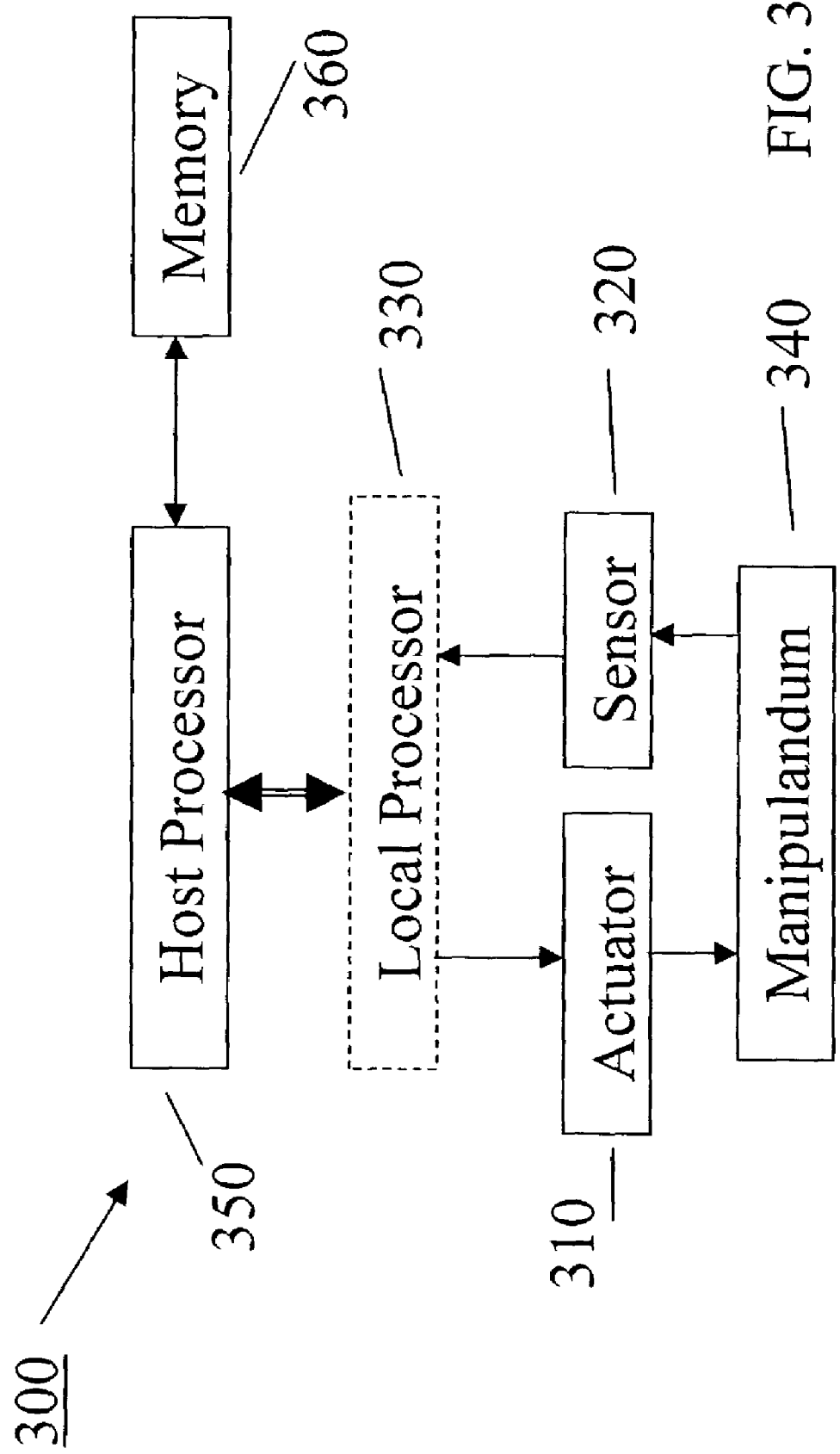
FIG. 3 illustrates a block diagram of a kinesthetic force feedback system, according to an embodiment of the invention.

FIG. 3 shows a block diagram of a force feedback system 300, according to an embodiment of the invention. The force feedback system 300 includes an actuator 310, a sensor 320, and a "local" processor 330 in communication with the actuator 310 and the sensor 320. The actuator 310 and the sensor 320 can be coupled to a manipulandum 340, and are operable to detect the motion of and output force feedback to the manipulandum 340. The manipulandum 340 can be for example a knob, a scroll wheel, a steering wheel, a jog dial, a joystick, a shifter, a medical instrument, or any other known user-manipulable device. The local processor 330 is further in communication with a "host" processor 350 (e.g., a central processor/controller), and is configured to transmit the signals from the sensor 320 to the host processor 350 and output force feedback signals to the actuator 310 based on the instructions from the host processor 350. Such a "local" processor has been used in various force feedback systems to alleviate the work load of the host processor, so as to reduce the delay in delivering force feedback effects. For further details, see U.S. Pat. Nos. 5,734,373; 6,285,351; and 6,300,936; the disclosures of which are all incorporated herein by reference.

By adapting a hierarchical method of the invention, such as described above, the local processor 330 may become optional or eliminated in some applications (as indicated by the phantom line), thereby enabling the force feedback system to be simpler, more modular and cost-effective in configuration and performance. This may be suitable in devices desired to deliver stable, high magnitude force effects. In such scenario, a processor-executable program comprising codes to practice a method of the invention can be stored in a memory 360, coupled to the host processor 350.

Code to implement the methods described above can be, for example, stored in memory 360, or can be present in local processor 330 or host processor 350. The code can be, for example, in a form that is executable by local processor 330 or host processor 350. Alternatively, the code can be in a form that is not immediately executed by a process. For example, the code can be compressed or encrypted so that through additional processing the code can be executable by a processor such as local processor 330 or host processor 350.

Those skilled in the art will recognize that the embodiments described above are provided by way of example, to elucidate the general principles of the invention. Various means and methods can be devised to perform the designated functions in an equivalent manner. Moreover, various changes, substitutions, and alternations can be made herein without departing from the principles and the scope of the invention.

What is claimed is:

1. A method, comprising:
assigning a priority value to each of one or more force effects, the priority value assigned to a force effect based upon a magnitude of an impact of the force effect upon one or more system parameters;
receiving a first force contribution associated with a first position of a manipulandum, the first force contribution including at least one force effect having a first priority value assigned thereto;
determining a second force contribution associated with a second position of the manipulandum, the second position being subsequent to the first position, the second force contribution including at least one force effect having a second priority value assigned thereto; and
outputting a force signal to an actuator coupled to the manipulandum, the actuator configured to render a feedback force, the feedback force including a sum of the first force contribution and the second force contribution.

2. The method of claim 1, wherein one of the one or more parameters is system stability.

3. The method of claim 2, wherein the at least one force effect having the second priority value assigned thereto includes at least one condition effect, and the at least one force effect having the first priority value assigned thereto includes at least one temporal effect.

4. The method of claim 1, wherein one of the one or more parameters is an effect gain.

5. The method of claim 4, wherein the at least one force effect having the second priority value assigned thereto includes at least one high gain force effect, and the at least one force effect having the first priority value assigned thereto includes at least one low gain force effect.

6. The method of claim 1, further comprising determining a third force contribution associated with the second position of the manipulandum, the third force contribution including at least one force effect, associated with the second position of the manipulandum, having a first priority value assigned thereto.

7. The method of claim 1, wherein the manipulandum includes one of a knob, a scroll wheel, a steering wheel, a jog dial, a joystick, and a medical instrument.

8. A processor-executable program, stored on a computer readable medium, comprising:
   code to receive a first force contribution associated with a first position of a manipulandum, the first force contribution including at least one force effect having a first priority value assigned thereto, the first priority value assigned to a force effect based upon a first magnitude of an impact of the force effect upon one or more system parameters;
   code to determine a second force contribution associated with a second position of the manipulandum, the second position being subsequent to the first position, the second force contribution including at least one force effect having a second priority value assigned thereto, the second priority value assigned to a force effect based upon a second magnitude of the impact of the force effect upon the one or more system parameters; and
   code to output a force signal to an actuator coupled to the manipulandum, the actuator configured to render a feedback force having a sum of the first force contribution and the second force contribution.

9. The processor-executable program of claim 8 further comprising: code to determine a third force contribution associated with the second position of the manipulandum, the third force contribution including at least one force effect, associated with the second position of the manipulandum, having a first priority value assigned thereto.

10. The processor-executable program of claim 8 wherein the at least one force effect having the second priority value assigned thereto includes at least one condition effect, and the at least one force effect having the first priority value assigned thereto includes at least one temporal effect.

11. The processor-executable program of claim 8 wherein the at least one force effect having the second priority value assigned thereto includes at least one high gain force effect, and the at least one force effect having the first priority value assigned thereto includes at least one low gain force effect.

12. An apparatus, comprising:
   a manipulandum having a range of motion including a first position and a second position, the second position being subsequent to the first position;
   a sensor coupled to the manipulandum and operable to monitor a position of the manipulandum in the range of motion; and
   an actuator coupled to the manipulandum, the actuator configured to receive a force signal and output a feedback force having a first force contribution and a second force contribution, the first force contribution associated with the first position of the manipulandum and including at least one force effect having a first priority value assigned thereto, the first priority value assigned to a force effect based upon a first magnitude of an impact of the force effect upon one or more system parameters, the second force contribution being associated with the second position of the manipulandum and including at least one force effect having a second priority value assigned thereto, the second priority value assigned to a force effect based upon a second magnitude of the impact of the force effect upon the one or more system parameters.

13. The apparatus of claim 12 wherein the at least one force effect having the second priority value assigned thereto includes at least one condition effect, and the at least one force effect having the first priority value assigned thereto includes at least one temporal effect.

14. The apparatus of claim 12 further comprising:
   a processor, in communication with the sensor and the actuator, the processor operative to receive a signal from the sensor and output the force signal to the actuator.

15. The apparatus of claim 14 further comprising a memory storing a program executable by the processor, the program comprising:
   code to receive the first force contribution associated with the first position of the manipulandum;
   code to determine the second force contribution associated with the second position of the manipulandum, the second position being subsequent to the first position; and
   code to output the force signal to the actuator coupled to the manipulandum.

16. The apparatus of claim 12 wherein the manipulandum includes one of a knob, a scroll wheel, a steering wheel, a jog dial, a joystick, and a medical instrument.

17. The apparatus of claim 12 wherein the at least one force effect having the second priority value assigned thereto includes at least one high gain force effect, and the at least one force effect having the first priority value assigned thereto includes at least one low gain force effect.

* * * * *